(12) United States Patent
Chen et al.

(10) Patent No.: US 9,285,021 B2
(45) Date of Patent: Mar. 15, 2016

(54) LINEAR MODULE WITH A SUPPORT DEVICE

(71) Applicant: Hiwin Technologies Corp., Taichung (TW)

(72) Inventors: Jen-Sheng Chen, Taichung (TW); Lung-Yu Chang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 112 days.

(21) Appl. No.: 14/338,158

(22) Filed: Jul. 22, 2014

(65) Prior Publication Data

US 2016/0025198 A1    Jan. 28, 2016

(51) Int. Cl.
*F16H 25/20*    (2006.01)

(52) U.S. Cl.
CPC .......... *F16H 25/20* (2013.01); *F16H 2025/204* (2013.01); *F16H 2025/2031* (2013.01)

(58) Field of Classification Search
CPC ................. F16H 2025/2436; F16H 2025/2445
USPC ............................................. 492/39; 187/410
See application file for complete search history.

(56) References Cited

U.S. PATENT DOCUMENTS

| | | | | |
|---|---|---|---|---|
| 4,573,566 A * | 3/1986 | Roman | .................. | B23Q 5/402 198/461.1 |
| 4,896,758 A * | 1/1990 | Hoszowski | ............. | B60B 19/12 193/37 |
| 5,319,990 A * | 6/1994 | Veale | ..................... | B23Q 5/404 160/85 |
| 5,720,202 A | 2/1998 | Senjo et al. | | |
| 5,747,896 A * | 5/1998 | Nagai | ..................... | B23Q 1/017 310/20 |
| 6,240,796 B1 * | 6/2001 | Yamada | ............... | B23Q 1/0063 74/89.23 |
| 8,534,147 B2 * | 9/2013 | Roither | ................ | A47C 20/041 74/89.33 |
| 2001/0015581 A1 * | 8/2001 | Sato | ......................... | B23Q 5/40 310/83 |
| 2013/0239854 A1 * | 9/2013 | Huang | ..................... | B23Q 5/40 108/20 |
| 2015/0204428 A1 * | 7/2015 | Chang | ..................... | F16H 25/24 74/89.32 |

\* cited by examiner

*Primary Examiner* — David M Fenstermacher
*Assistant Examiner* — Randell J Krug
(74) *Attorney, Agent, or Firm* — Wang Law Firm, Inc.

(57) ABSTRACT

A linear module with a support device includes a base; two pivot seats fixed on the base; a screw disposed between the two pivot seats; a rail fixed to the base; a movable platform and two support members sleeved onto the screw and movable along the rail; a wheel rotatably disposed on the platform; a connecting member; and a cover. The support members are located at two ends of the platform, and the wheel includes a first wheel portion and a second wheel portion smaller in diameter than the first wheel portion. The connecting member includes two connecting ends fixed to the support members and a connecting bottom surface for pressing against the second wheel portion. The cover includes two cover ends fixed to the two pivot seats, and a cover bottom surface pressing against the first wheel portion.

10 Claims, 22 Drawing Sheets

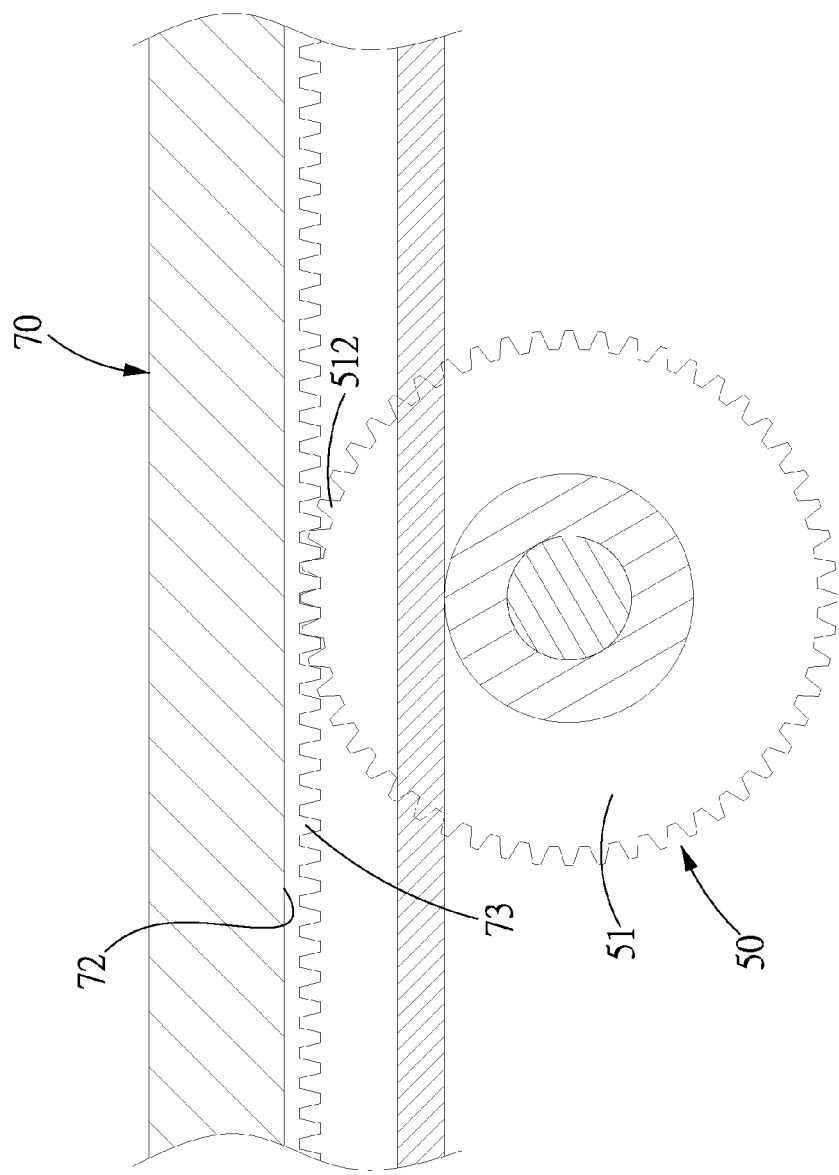

LINEAR MODULE WITH A SUPPORT DEVICE

BACKGROUND OF THE INVENTION

1. Field of the Invention

The present invention relates to a linear module, and more particularly to a linear module with a support device.

2. Description of the Prior Art

A motion transmission apparatus used on a machine generally comprises a screw and a nut movably disposed on the screw. To prevent sagging of the screw, the motion transmission apparatus is usually provided with a support device, so that the nut can move along the same central line, which can reduce abrasion, prevent too high temperature and structure deformation, and also expand the movement range of the nut and ensure machining precision.

As shown in FIG. 1, a ball screw actuator disclosed in U.S. Pat. No. 5,720,202 comprises a rail 12 disposed at one side of the screw 11, and three support members 13 movably disposed between the screw 11 and the rail 12. The support members 13 are used to support the screw 11 and prevent sagging of the same, and the movement of the support members 13 is controlled by belts 14, 15 and pulleys 16, 17, 18 and 19.

Since the movement of the support members 13 is controlled by the belts 14, 15 and the pulleys 16, 17, 18 and 19, which makes the ball screw complicated in structure. Besides, the belts 14, 15 are likely to wear off or even broken after a certain period of time of use, which results in low reliability and high maintenance cost. Besides, the support members are provided with no covers (not shown).

The present invention has arisen to mitigate and/or obviate the afore-described disadvantages.

SUMMARY OF THE INVENTION

The primary objective of the present invention is to provide a linear module with a support device which has a simple structure and low maintenance cost.

Another objective of the present invention is to provide a linear module with a support device which has an extended service life.

Another objective of the present invention is to provide a linear module with a support device capable of supporting the cover, and reducing the interference of the cover with the movable platform and the support members.

To achieve the above objectives, a linear module with a support device in accordance with the present invention comprises: a base; two pivot seats fixed on the base in a spaced apart manner; a screw disposed between the two pivot seats; at least one rail fixed to the base and located at one side of the screw; a movable platform sleeved onto the screw and movable along the rail; two support members sleeved onto the screw and movable along the rail; a wheel rotatably disposed on the movable platform; a connecting member; and a cover. The support members are located at two ends of the movable platform, the wheel includes at least one first wheel portion, and the second wheel portion has a diameter smaller than a diameter of the first wheel portions. The connecting member includes two connecting ends fixed to the support members, and a connecting bottom surface which comes into contact with and is driven to move by the second wheel portion. The cover includes two cover ends fixed to the two pivot seats, and a cover bottom surface which comes into contact with the first wheel portions.

Preferably, two said rails are fixed to the base in a parallel manner and located at two sides of the screw, and each of the movable platform and the support members is provided with a slide bock slidably disposed on the rail.

Preferably, the movable platform includes a top surface and a slot formed on the top surface, the wheel is rotatably disposed in the slot and partially protruded out of the top surface of the movable platform.

Preferably, a shoulder portion is formed on each of two opposite inner surfaces of the slot, the wheel further includes a shaft portion which is inserted through the first and second wheel portions and has two ends disposed on the shoulder portions.

Preferably, the wheel includes two said wheel portions, and each of the wheel portions is annularly provided with a plurality of first engaging teeth, and the cover bottom surface of the cover is provided with a rack for mating with the first engaging teeth.

Preferably, the cover bottom surface of the cover is provided with a groove for accommodation of the rack.

Preferably, the second wheel portion of the wheel is provided with second engaging teeth for mating with a rack portion which is formed at the connecting bottom surface of the connecting member.

Preferably, the wheel includes two said wheel portions, and each of the wheel portions is annularly provided with a plurality of first engaging teeth, the cover bottom surface of the cover is provided with a rack for mating with the first engaging teeth, and the second wheel portion of the wheel is provided with second engaging teeth for mating with a rack portion which is formed at the connecting bottom surface of the connecting member.

Preferably, the diameter of the first wheel portion is two times the diameter of the second wheel portion.

Preferably, the cover bottom surface of the cover is provided with a groove for accommodation of an antiskid member which is kept into contact with the first wheel portion of the wheel.

BRIEF DESCRIPTION OF THE DRAWINGS

FIG. 9B is an assembly cross sectional view of a part of the linear module with a support device in accordance with the second embodiment of the present invention;

DETAILED DESCRIPTION OF THE PREFERRED EMBODIMENTS

Figure 1:
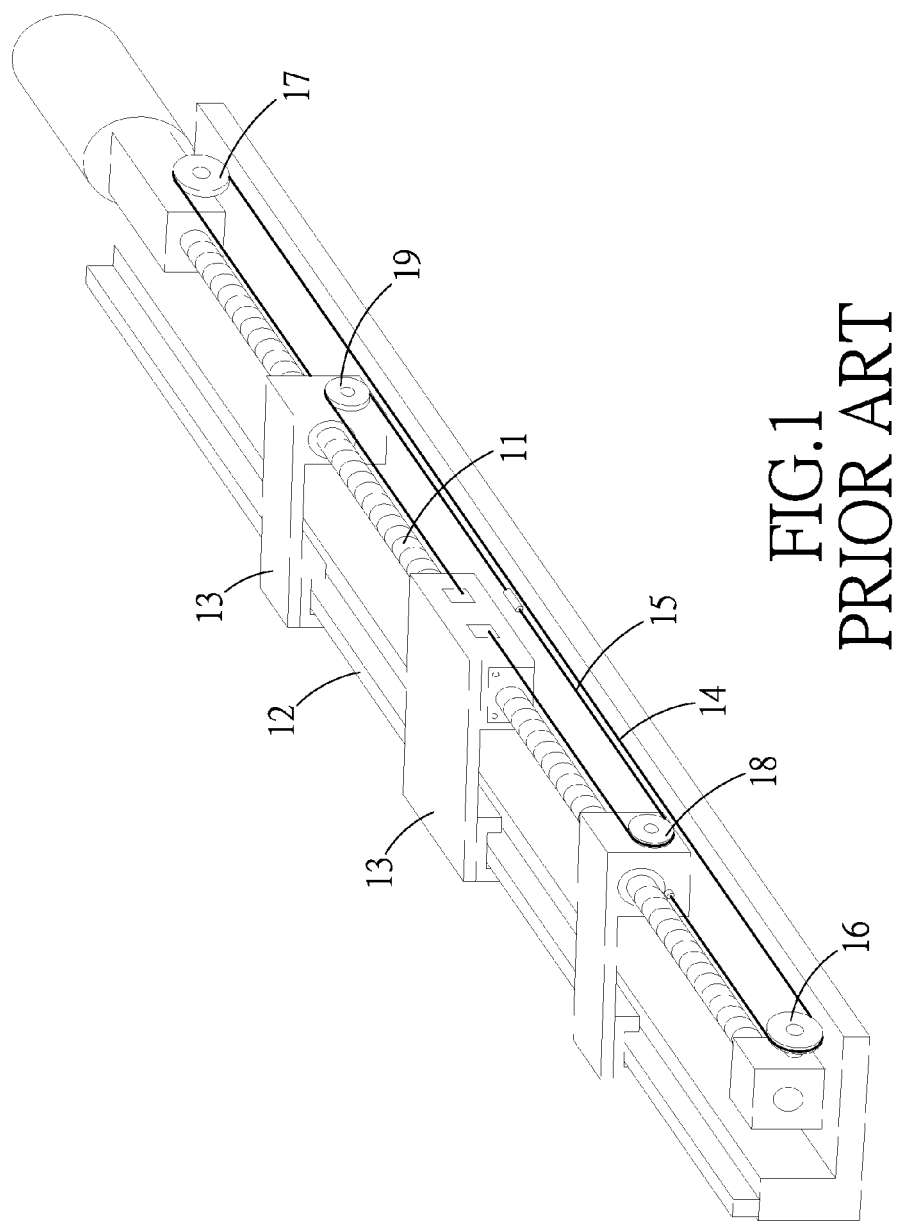
FIG. 1 shows a ball screw actuator disclosed in U.S. Pat. No. 5,720,202.
Figure 2:
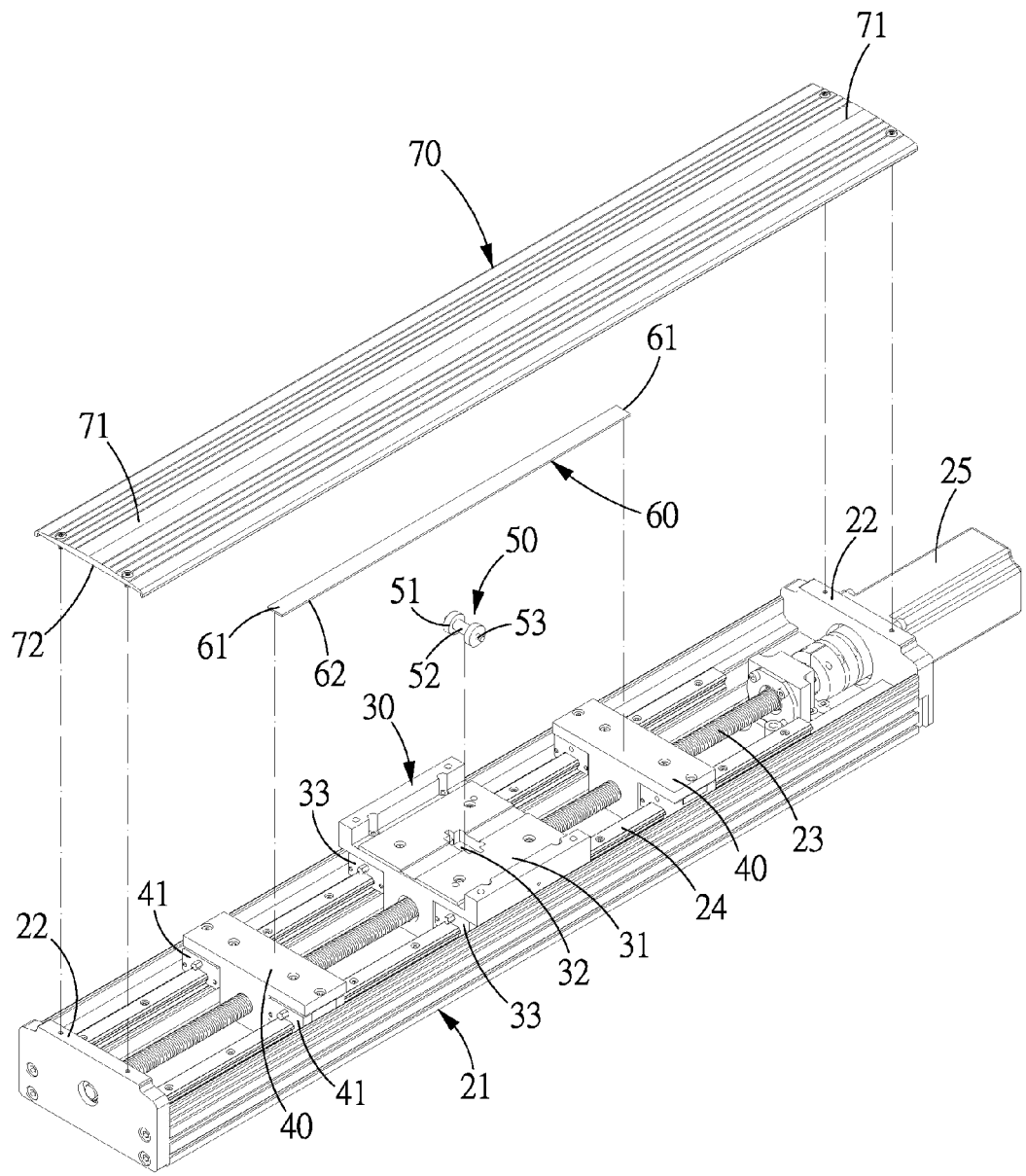
FIG. 2 is an exploded view of a linear module with a support device in accordance with a first embodiment of the present invention.
Figure 3:
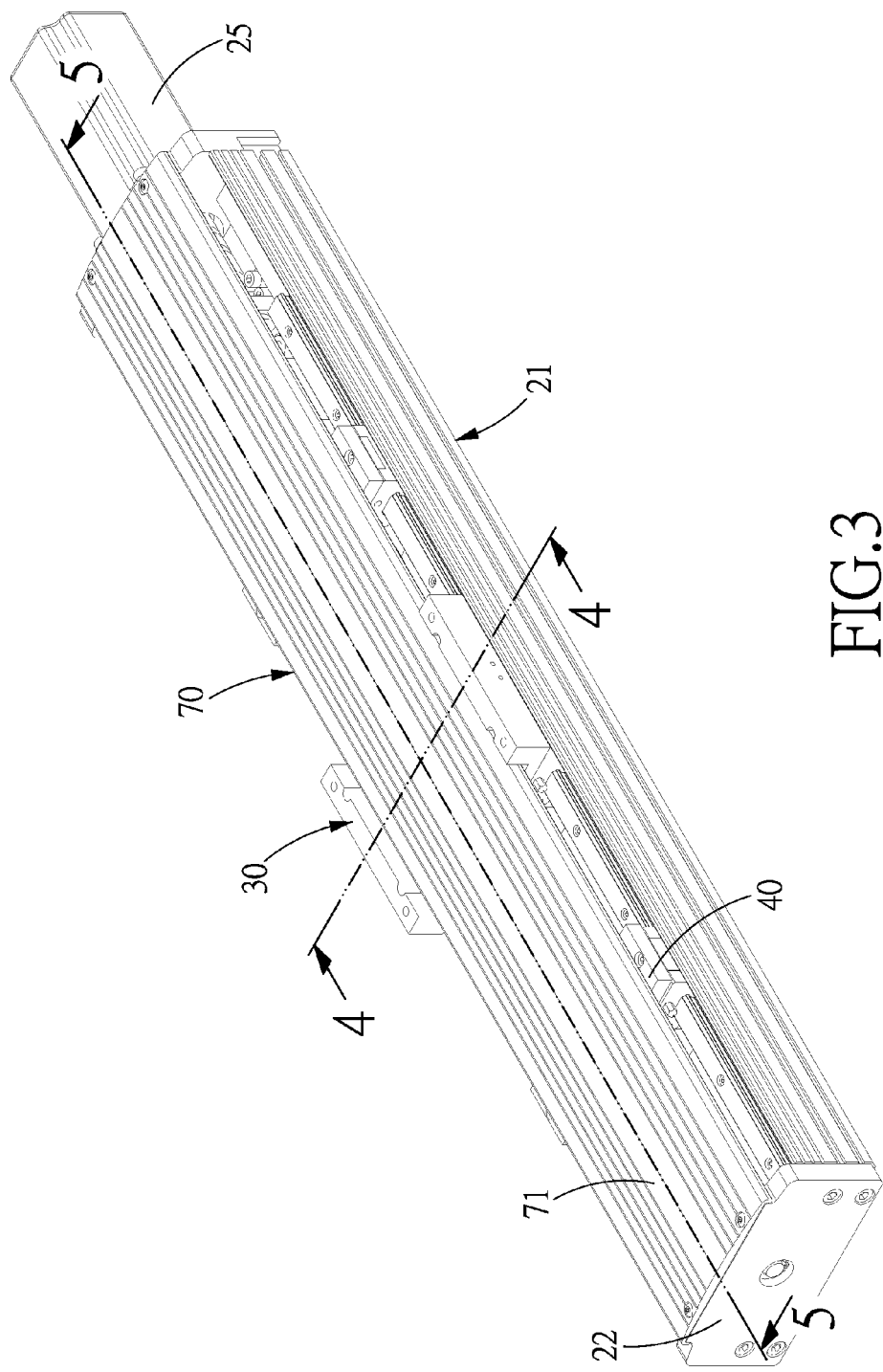
FIG. 3 is an assembly view of the linear module with a support device in accordance with the first embodiment of the present invention.
Figure 4:
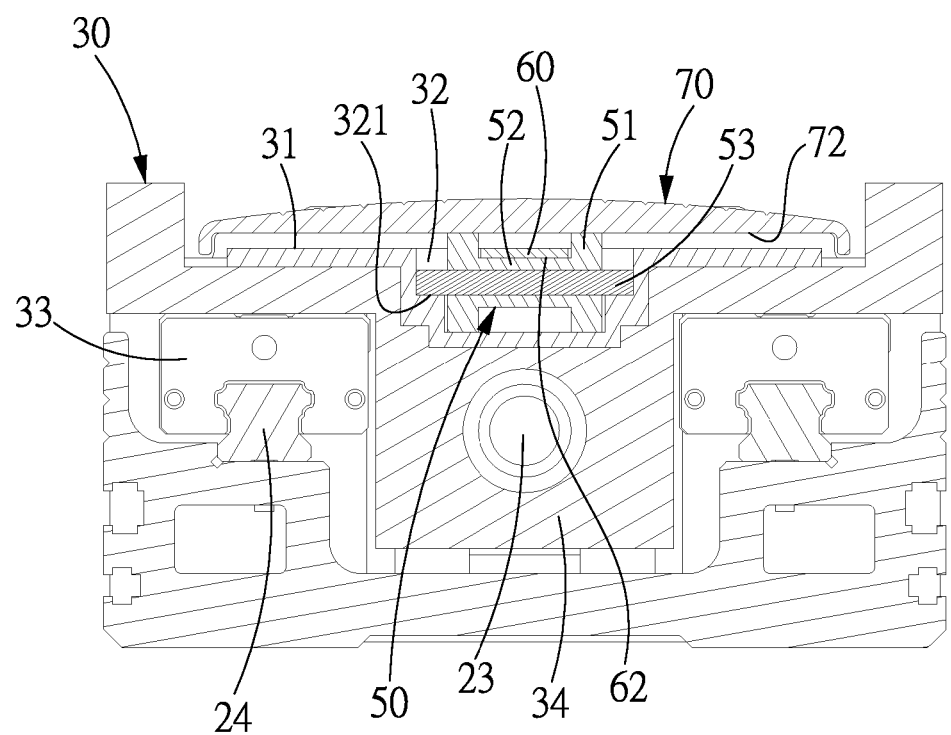
FIG. 4 is a cross sectional view taken along the line 4-4 of FIG. 3.
Figure 5:
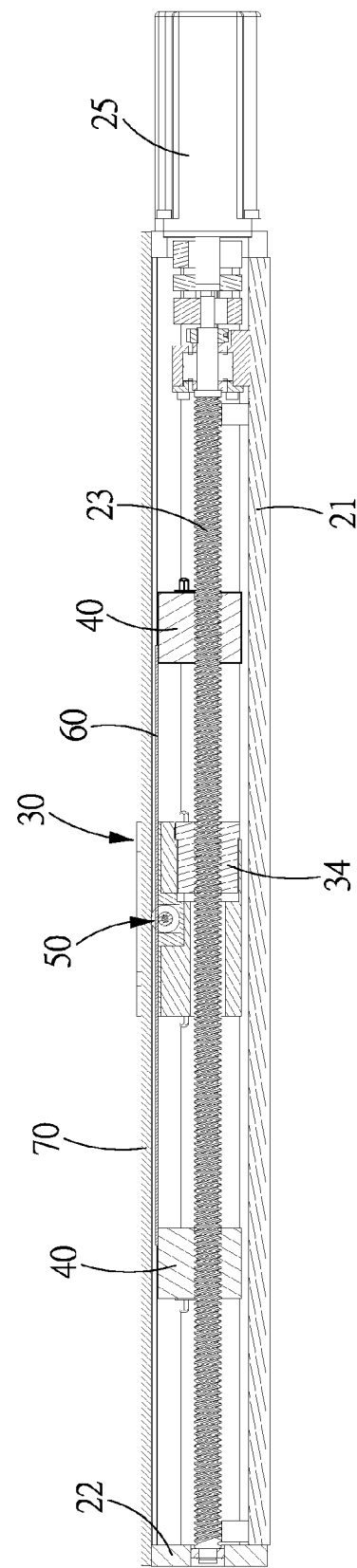
FIG. 5 is a cross sectional view taken along the line 5-5 of FIG. 3.

The present invention will be clearer from the following description when viewed together with the accompanying drawings, which show, for purpose of illustrations only, the preferred embodiment in accordance with the present invention.

Referring to FIGS. 1-6, a linear module with a support device in accordance with a first embodiment of the present invention comprises: a base 21, two pivot seats 22, a screw 23, two rails 24, a movable platform 30, two support members 40, a wheel 50, a connecting member 60 and a cover 70. The movable platform 30, the two support members 40, the wheel 50 and the connecting member 60 constitute the support device for supporting the screw 23 and the cover 70.

The base 21 is an elongated structure.

The pivot seats 22 are fixed on the base 21 in a spaced apart manner.

The screw 23 is disposed between the two pivot seats 22. In this embodiment, the screw 23 is driven by a motor 25 to rotate between the two pivot seats 22.

The two rails 24 are fixed to the base 21 in a parallel manner and located at two sides of the screw 23.

The movable platform 30 is sleeved onto the screw 23 and movable along the rails 24. In this embodiment, the movable platform 30 includes a top surface 31 and a slot 32 formed on the top surface 31. On each of two opposite inner surfaces of the slot 32 is formed a shoulder portion 321. The movable platform 30 is provided with two slide blocks 33 slidably disposed on the two rails 24. It is to be noted that inside the movable platform 30 is disposed a nut 34 sleeved onto the screw 23. Since the nut 34 and the screw 23 are of conventional arts, no further descriptions are provided.

The two support members 40 are sleeved onto the screw 23 and movable along the rails 24, and located at two ends of the movable platform 30. In this embodiment, the support members 40 each have two slide blocks 41 slidably disposed on the rails 24.

Figure 7:
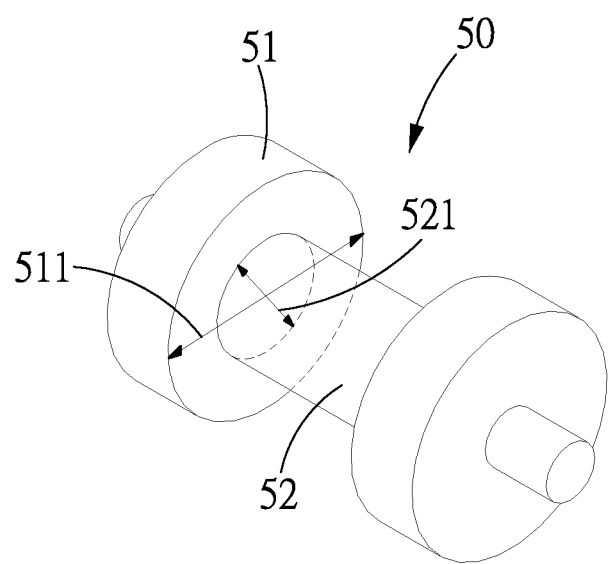
FIG. 7 shows the wheel of the linear module with a support device in accordance with the first embodiment of the present invention.

The wheel 50 is rotatably disposed in the slot 32 of the movable platform 30 and includes two first wheel portions 51, a second wheel portion 52 which is located between and has a diameter 521 smaller than a diameter 511 of the first wheel portions 51, and a shaft portion 53 which is inserted through the first and second wheel portions 51, 52 and has two ends disposed on the shoulder portions 321. In this embodiment, the first wheel portions 51 are partially protruded out of the top surface 31 of the movable platform 30, and the diameter 511 of the first wheel portions 51 is two times the diameter 521 of the second wheel portion 52, as shown in FIG. 7.

The connecting member 60 is a plate which is less likely to deform and has two connecting ends 61 fixed to the support members 40, and a connecting bottom surface 62 which comes into contact with and is driven to move by the second wheel portion 52. In this embodiment, there is no slippage between the connecting bottom surface 62 and the second wheel portion 52.

The cover 70 includes two cover ends 71 fixed to the two pivot seats 22, and a cover bottom surface 72 which comes into contact with the first wheel portions 51. In this embodiment, there is no slippage between the first wheel portions 51 and the cover bottom surface 72, so that, when the screw 23 drives the movable platform 30 to move back and forth, the wheel 50 will also be caused to rotate clockwise or counterclockwise.

What mentioned above are the structures of the first embodiment of the present invention, for a better understanding of the invention, its operating advantages and the specific objects attained by its uses, reference should be had to the following descriptive matter.

First of all, since the wheel 50 is rotatably disposed in the slot 32 of the movable platform 30 and has the first and second wheel portions 51, 52 partially protruded out of the top surface 31, the part of the first wheel portions 51 protruded out of the top surface 31 will come into contact with the cover bottom surface 72 to support the cover 70, preventing sagging of the cover 70, and reducing the interference of the cover 70 with the movable platform 30 and the support members 40.

Secondly, since the movable platform 30 and the two support members 40 are sleeved onto the screw 23 and movable along the rails 24, which can provide support to and prevent sagging of the screw 23. Besides, the relative motion or interaction between the movable platform 30 and the support members 40 is controlled by the single wheel 50 and the single connecting member 60. Hence, the structure of the support device of the ball screw of the present invention is much simple than that of the conventional ball screw, which consequently results in a low maintenance cost.

In the third place, since the movable platform 30, the support members 40, the pulley and the connecting member 60 constitute the support device to support the screw 23 and the cover 70, the movable platform 30 and the support members 40 can be made of rigid material, and the wheel 50 and connecting member 60 between the movable platform 30 and the support members 40 can be a block and a plate which are less likely to deform. Therefore, the service life of the movable platform 30, the support members 40, the pulley and the connecting member 60 which are used to support the screw 23 and the cover 70 can be extended. Besides, the support device of the present invention requires no use of belts and pulleys, which reduces structure complexity of the support device, and consequently improving reliability and reducing maintenance cost of the support device of the present invention.

Figure 6:
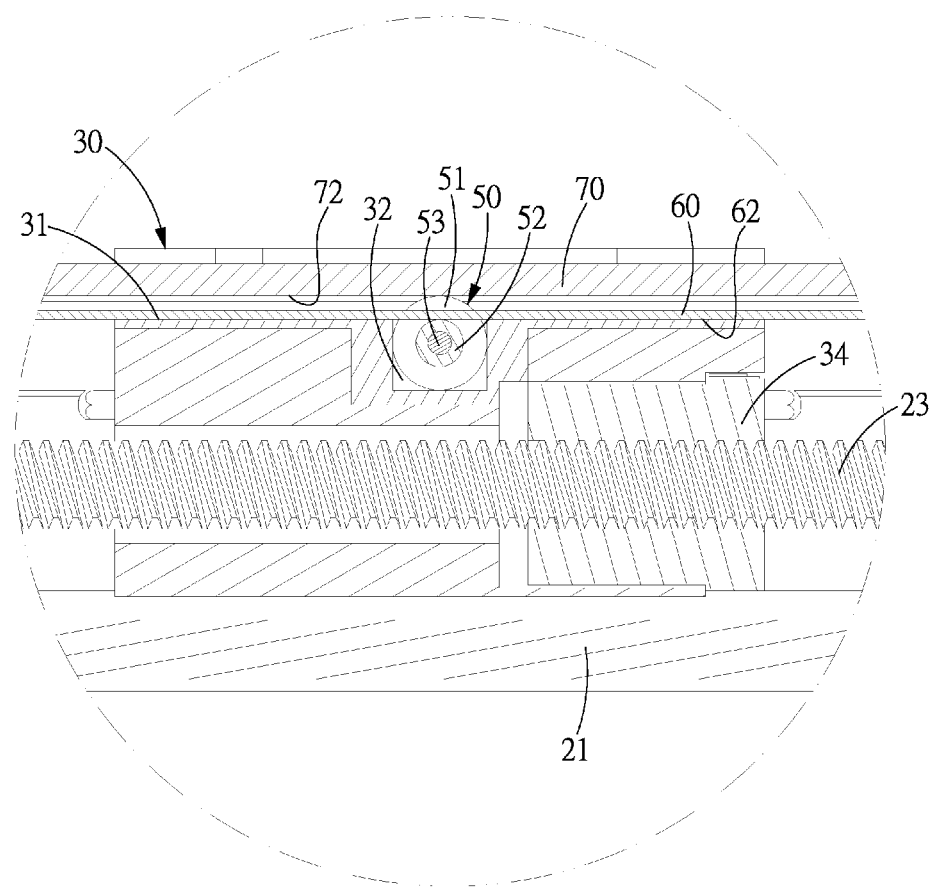
FIG. 6 is a detail view of a part of FIG. 5.
Figure 8:
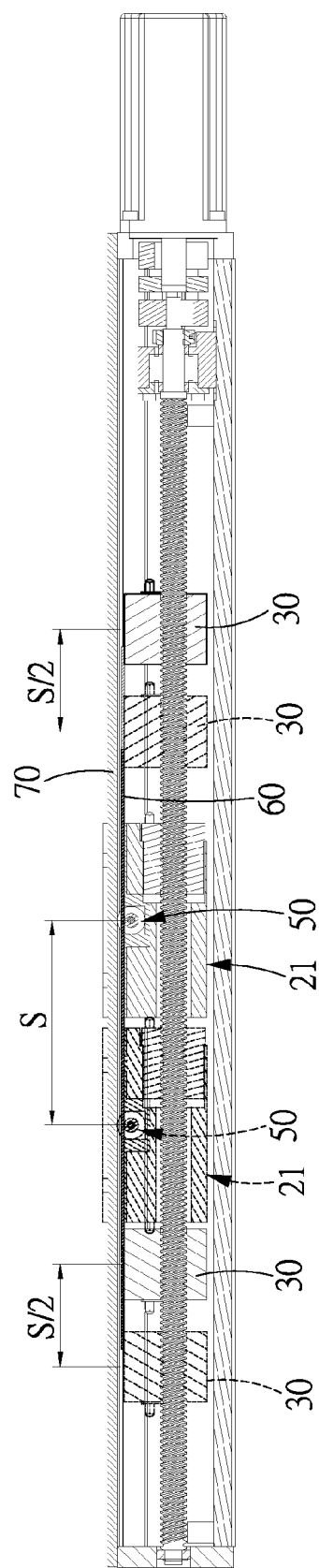
FIG. 8 is an operational view of the linear module with a support device in accordance with the first embodiment of the present invention.

Finally, as shown in FIGS. 6-8, due to the fact that the first wheel portions 51 of the wheel 50 come into contact with the cover bottom surface 72 of the cover 70, the second wheel portion 52 is kept into contact with the connecting bottom surface 611 of the connecting member 60, the connecting ends 61 of the connecting member 60 are fixed to the two support members 40, and the diameter 511 of the first wheel portions 51 is two times the diameter 521 of the second wheel portion 52. the movable platform 30 will move along with the screw 23, when the screw 23 rotates, and when the movable platform 30 moves a distance S, the wheel 50 will rotate and pushes the connecting member 60 to move S/2 distance in an opposite direction, so that the support members 40 are moved S/2 distance.

Figure 9A:
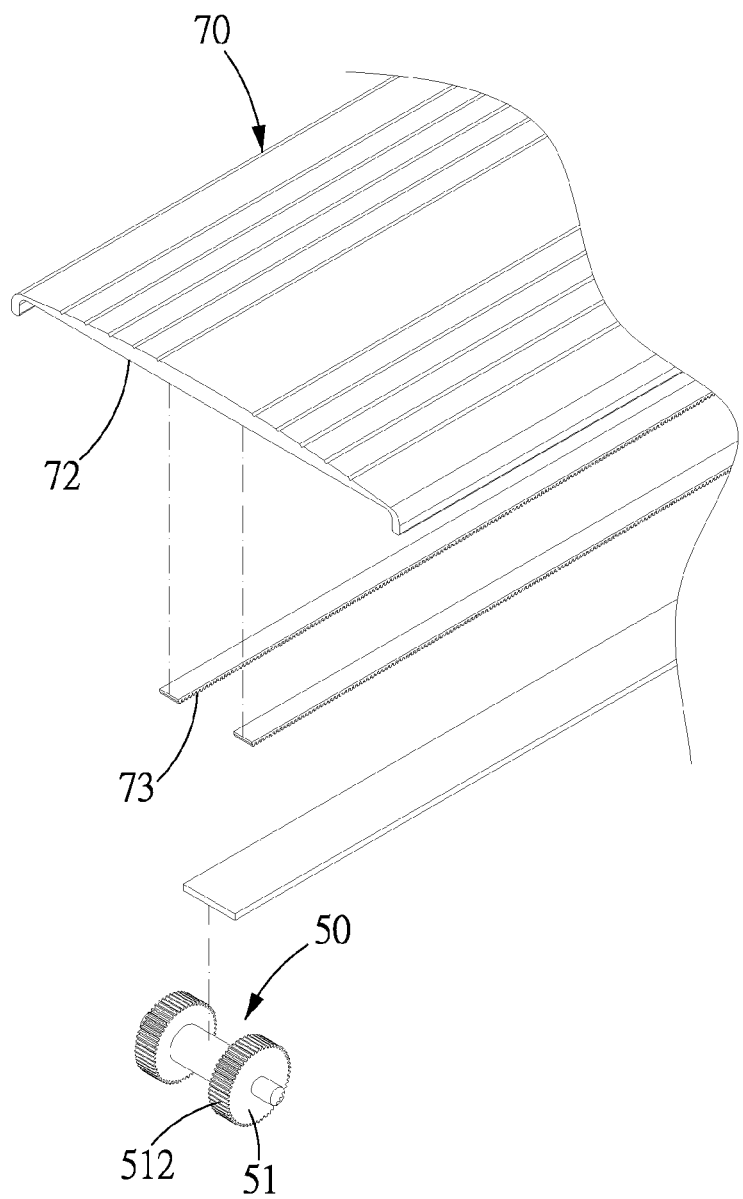
FIG. 9A is an exploded view of a part of a linear module with a support device in accordance with a second embodiment of the present invention.

Referring then to FIGS. 9A and 9B, a linear module with a support device in accordance with a second embodiment of the present invention is similar to the first embodiment, except that:

The first wheel portions 51 of the wheel 50 each are annularly provided with a plurality of first engaging teeth 512, and the cover bottom surface 72 of the cover 70 is provided with a rack 73 for mating with the first engaging teeth 512. When the screw 23 rotates at a high speed, the engagement of the first engaging teeth 512 and the rack 73 allows the wheel 50 to come into contact with the cover 70 without slippage therebetween, and provides better support to the cover 70.

Figure 10A:
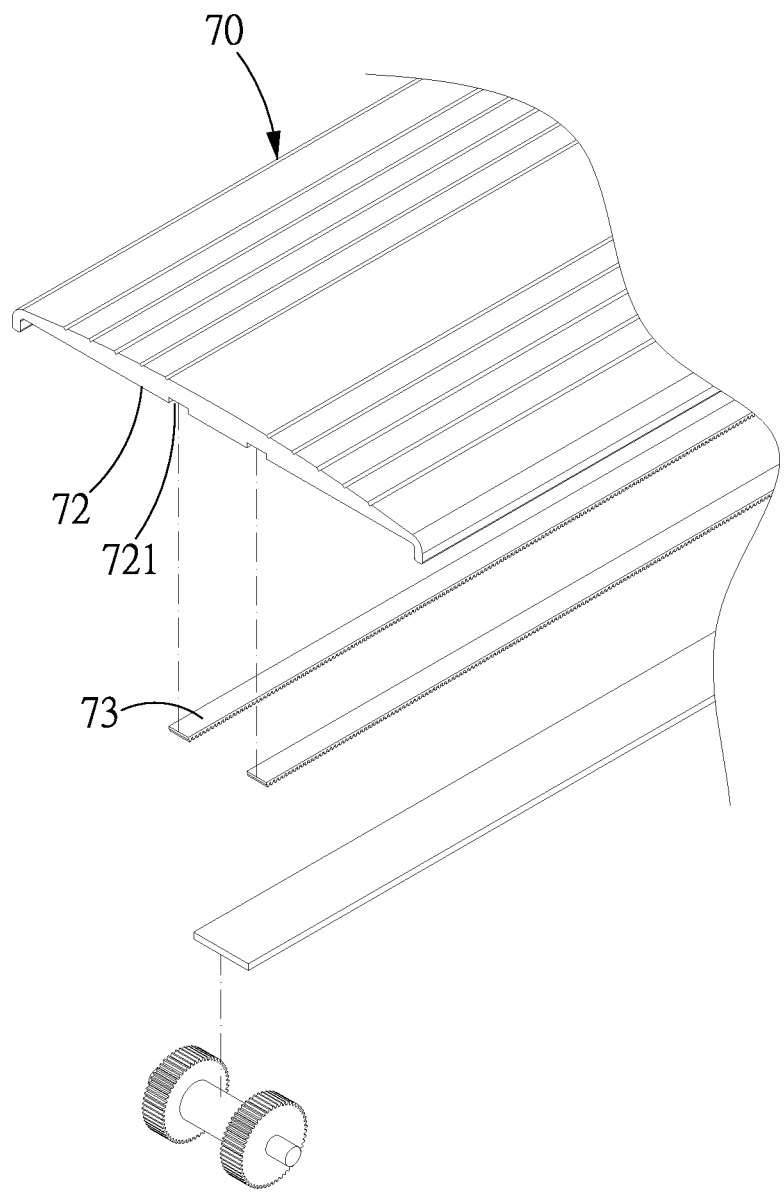
FIG. 10A is an exploded view of a part of a linear module with a support device in accordance with a third embodiment of the present invention.
Figure 10B:
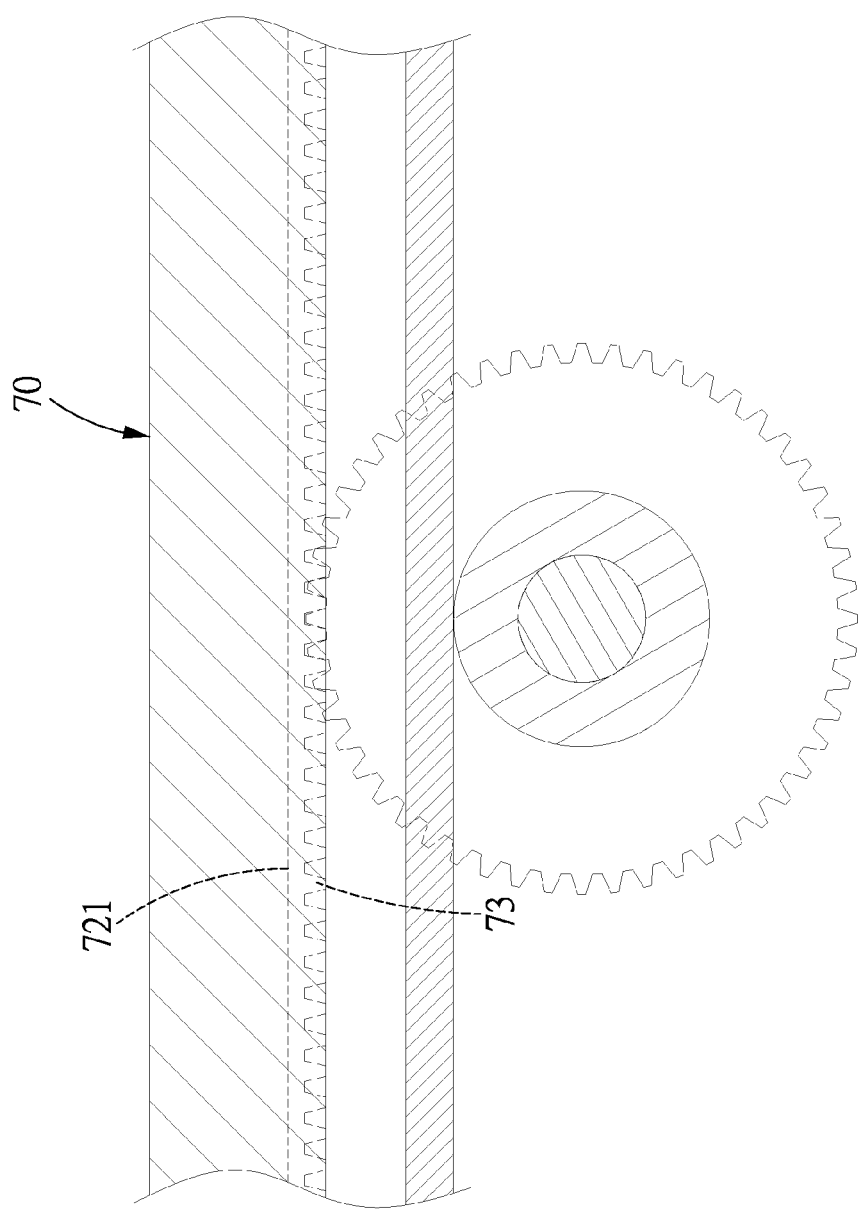
FIG. 10B is an assembly cross sectional view of a part of the linear module with a support device in accordance with the third embodiment of the present invention.

Referring then to FIGS. 10A and 10B, a linear module with a support device in accordance with a third embodiment of the present invention is similar to the second embodiment, except that: the cover bottom surface 72 of the cover 70 is provided with a groove 721 for accommodation of the rack 73.

Figure 11A:
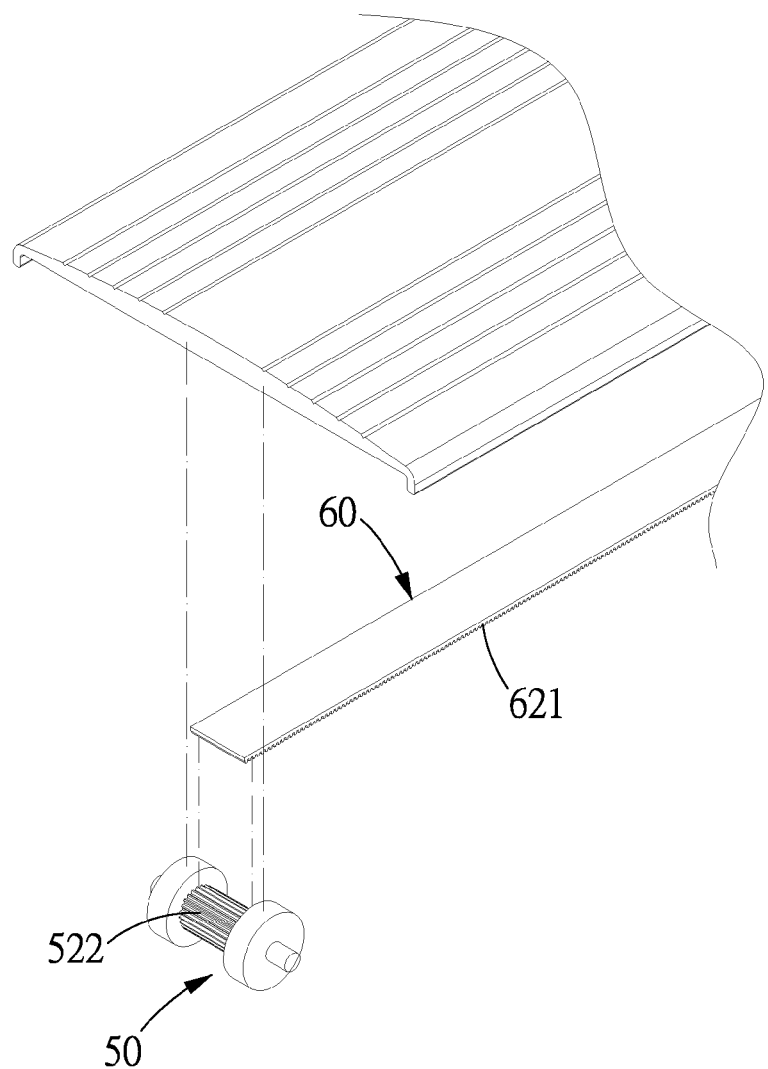
FIG. 11A is an exploded view of a part of a linear module with a support device in accordance with a fourth embodiment of the present invention.
Figure 11B:
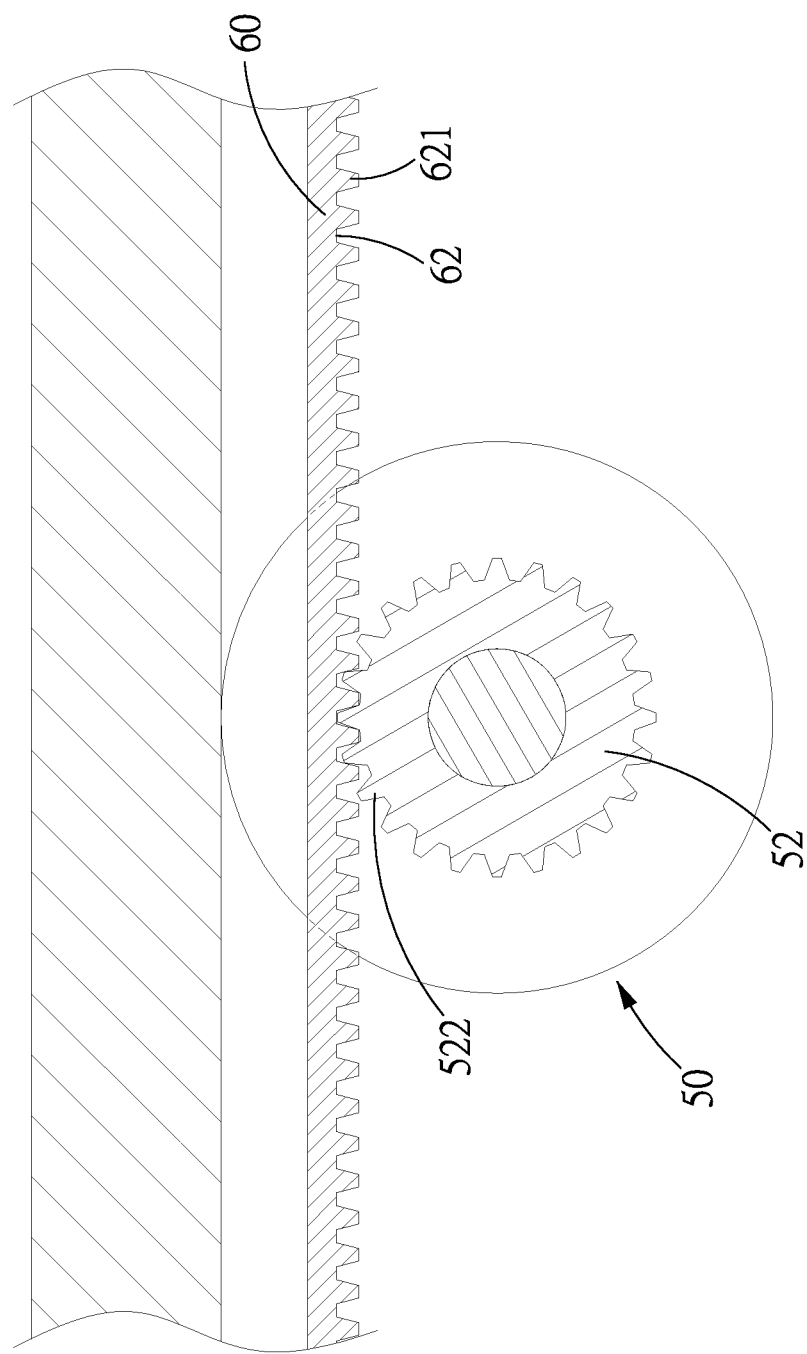
FIG. 11B is an assembly cross sectional view of a part of the linear module with a support device in accordance with the fourth embodiment of the present invention.

Referring then to FIGS. 11A and 11B, a linear module with a support device in accordance with a fourth embodiment of the present invention is similar to the first embodiment, except that: the second wheel portion 52 of the wheel 50 is provided with second engaging teeth 522 for mating with a rack portion 621 which is formed at the connecting bottom surface 62 of the connecting member 60. When the screw 23 rotates at a high speed, the engagement of the second engaging teeth 522 and the rack portion 621 allows the wheel 50 to come into contact with the connecting member 60 without slippage therebetween, and ensures a reliable interacting motion between the movable platform 30 and the support members 40.

Figure 12A:
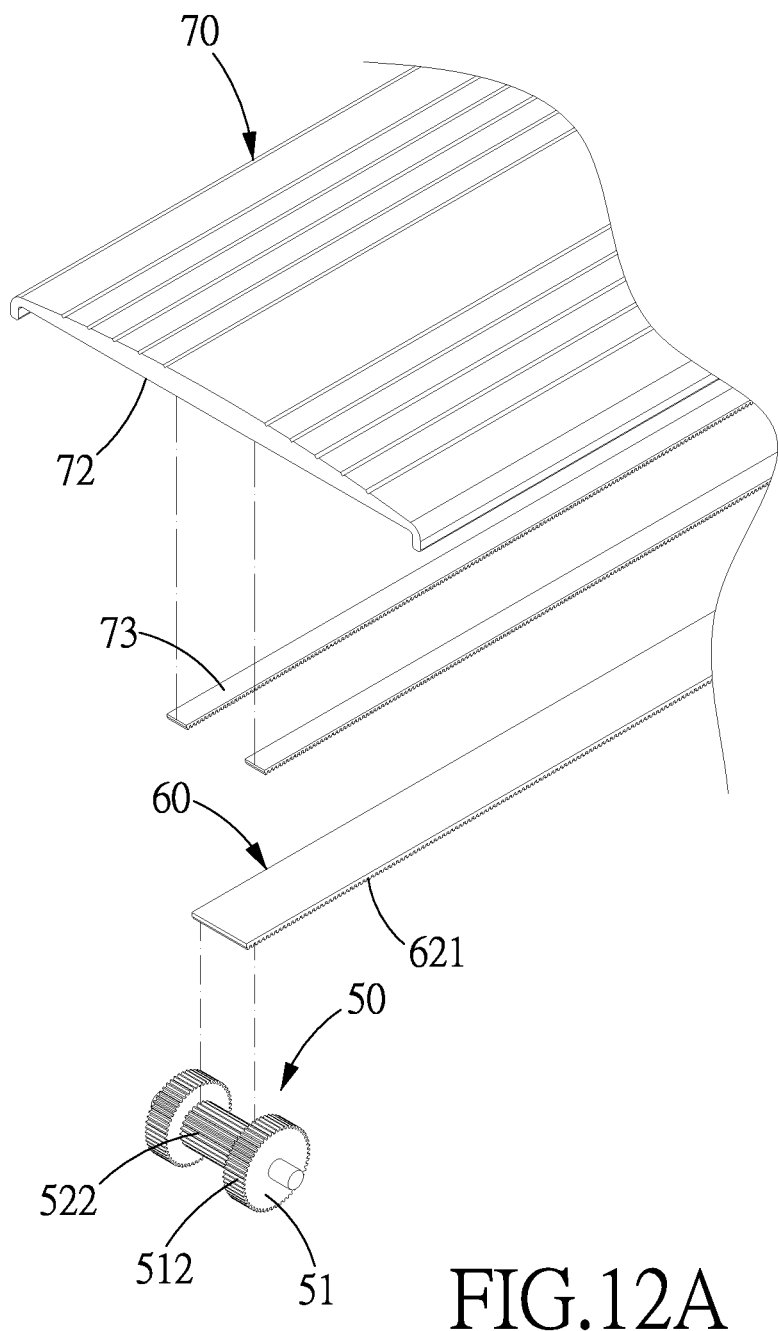
FIG. 12A is an exploded view of a part of a linear module with a support device in accordance with a fifth embodiment of the present invention.
Figure 12B:
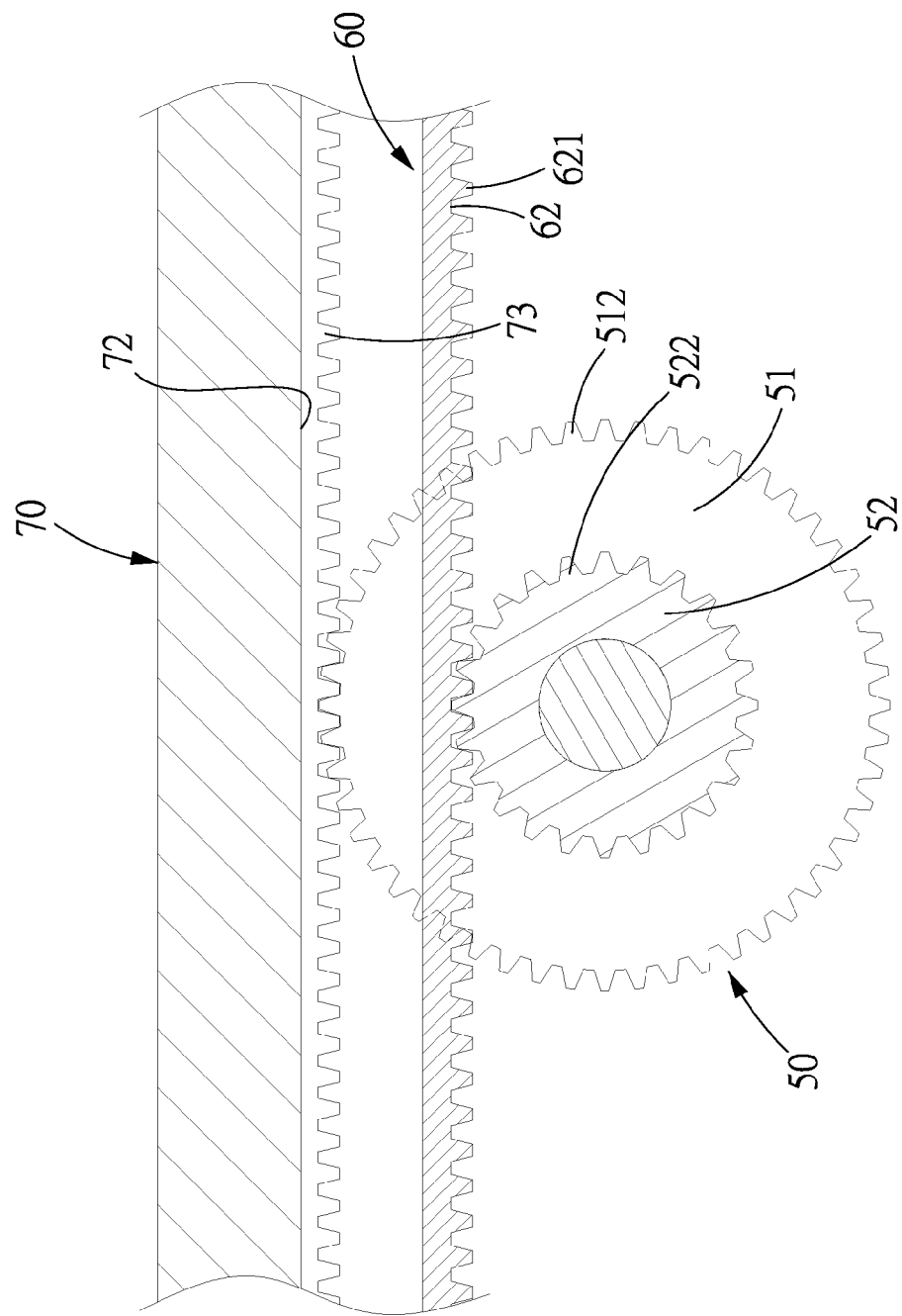
FIG. 12B is an assembly cross sectional view of a part of the linear module with a support device in accordance with the fifth embodiment of the present invention.

Referring then to FIGS. 12A and 12B, a linear module with a support device in accordance with a fifth embodiment of the present invention is similar to the first embodiment, except that:

The first wheel portions 51 of the wheel 50 each are annularly provided with a plurality of first engaging teeth 512, and the cover bottom surface 72 of the cover 70 is provided with a rack 73 for mating with the first engaging teeth 512. The second wheel portion 52 of the wheel 50 is provided with second engaging teeth 522 for mating with a rack portion 621 which is formed at the connecting bottom surface 62 of the connecting member 60. When the screw 23 rotates at a high speed, the engagement of the first engaging teeth 512 and the rack 73 allows the wheel 50 to come into contact with the cover 70 without slippage therebetween, and provides better support to the cover 70. When the screw 23 rotates at a high speed, the engagement of the second engaging teeth 522 and the rack portion 621 allows the wheel 50 to come into contact with the connecting member 60 without slippage therebetween, and ensures a reliable interacting motion between the movable platform 30 and the support members 40.

Figure 13A:
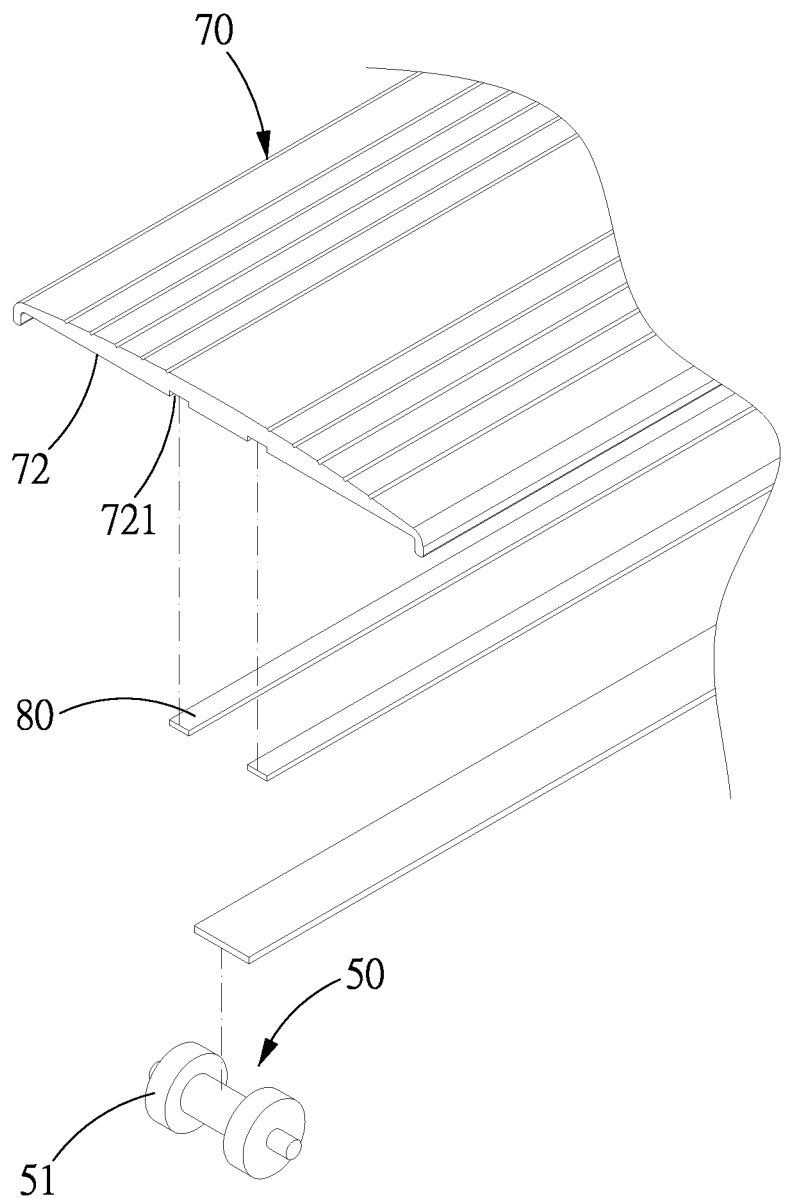
FIG. 13A is an exploded view of a part of a linear module with a support device in accordance with a sixth embodiment of the present invention.
Figure 13B:
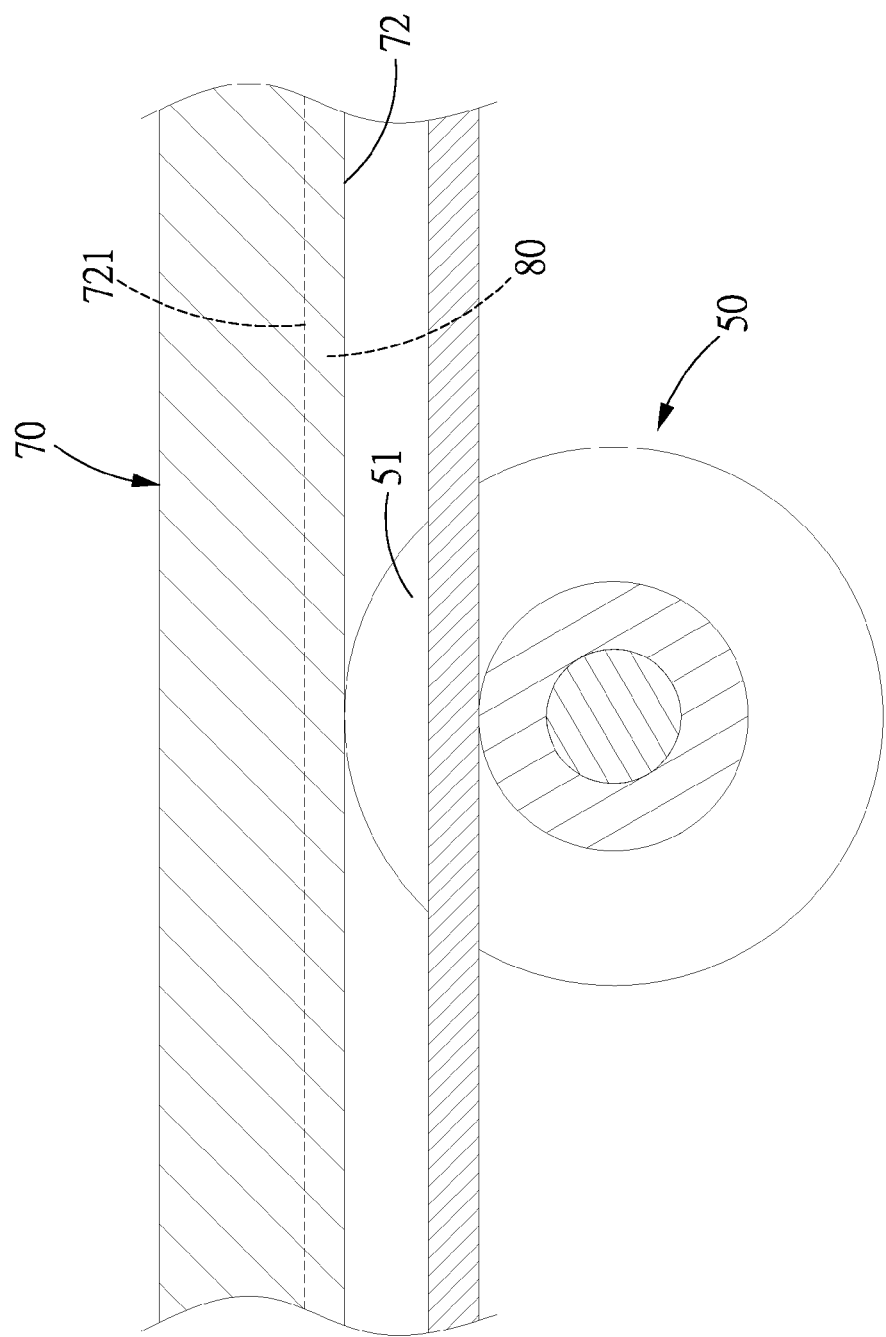
FIG. 13B is an assembly cross sectional view of a part of the linear module with a support device in accordance with the sixth embodiment of the present invention.

Referring then to FIGS. 13A and 13B, a linear module with a support device in accordance with a sixth embodiment of the present invention is similar to the first embodiment, except that:

The cover bottom surface 72 of the cover 70 is provided with two grooves 721 for accommodation of two antiskid members 80 which are kept into contact with the first wheel portions 51 of the wheel 50, and the antiskid members 80 are made of high friction material, so as to allow the wheel 50 to come into contact with the cover 70 without slippage therebetween, and provides better support to the cover 70.

Figure 14A:
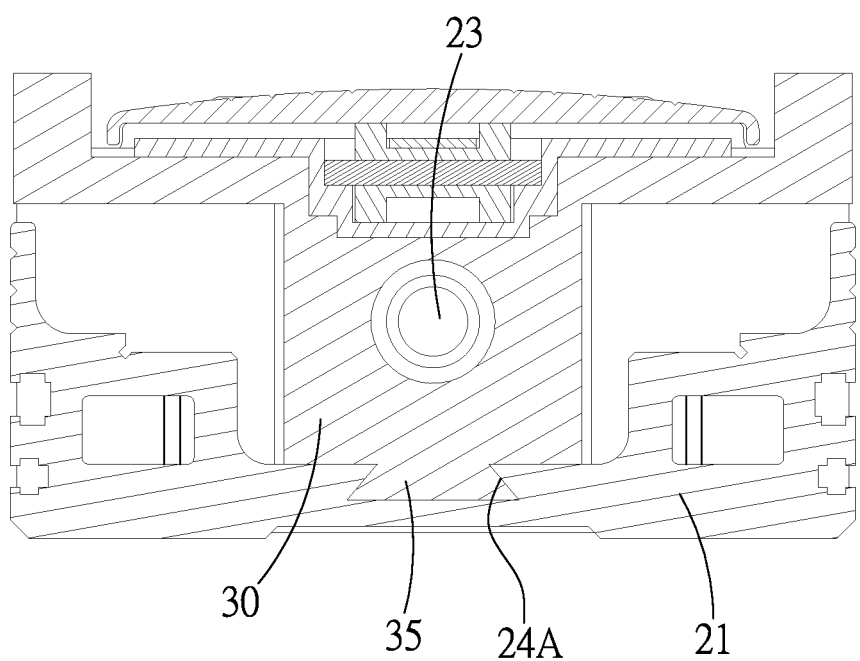
FIG. 14A is an assembly cross sectional view of a linear module with a support device in accordance with a seventh embodiment of the present invention.
Figure 14B:
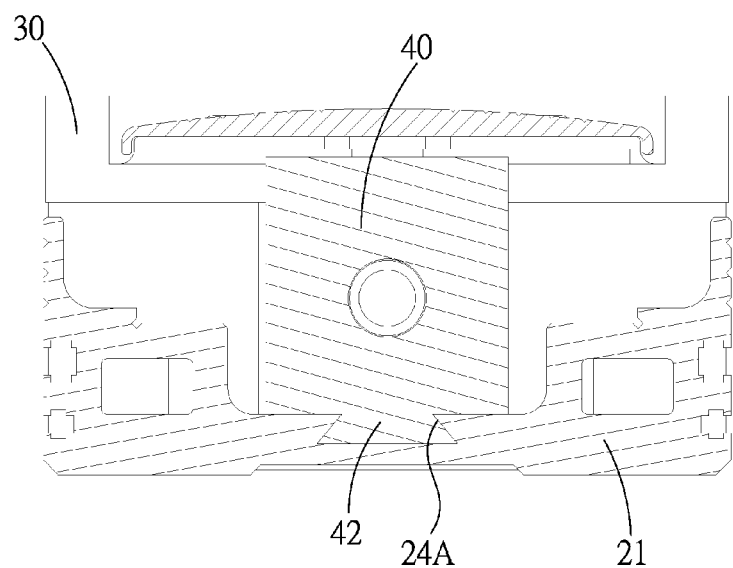
FIG. 14B is the other one assembly cross sectional view of the linear module with a support device in accordance with the seventh embodiment of the present invention.

Referring then to FIGS. 14A and 14B, a linear module with a support device in accordance with a seventh embodiment of the present invention is similar to the first embodiment, except that: there is only one rail which is in the form of a dovetailed groove 24A, and the rail is disposed on the base 21 and located below the screw 23. The movable platform 30 and the support members 40 are each formed with a dovetailed rib 35, 42 to be slidably disposed in the dovetailed groove 24A.

Figure 15A:
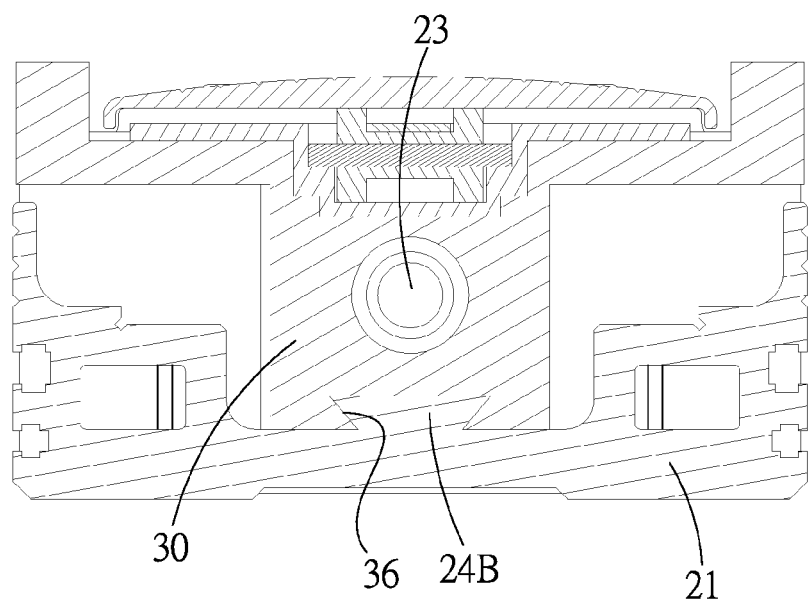
FIG. 15A is an assembly cross sectional view of a linear module with a support device in accordance with an eighth embodiment of the present invention.
Figure 15B:
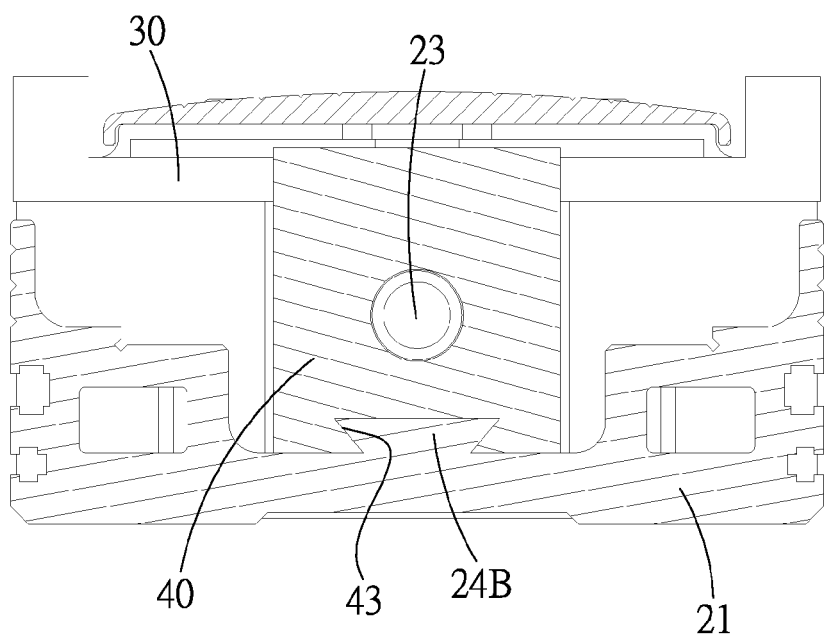
FIG. 15B is the other one assembly cross sectional view of the linear module with a support device in accordance with the eighth embodiment of the present invention.

Referring then to FIGS. 15A and 15B, a linear module with a support device in accordance with an eighth embodiment of the present invention is similar to the first embodiment, except that: there is only one rail which is formed with a dovetailed rib 24B, and the rail is disposed on the base 21 and located below the screw 23. The movable platform 30 and the support members 40 are each formed with a dovetailed groove 36, 43 to be slidably disposed in the dovetailed groove 24B.

While we have shown and described various embodiments in accordance with the present invention, it is clear to those skilled in the art that further embodiments may be made without departing from the scope of the present invention.

What is claimed is:

1. A linear module with a support device comprising:
a base;
two pivot seats fixed on the base in a spaced apart manner;
a screw disposed between the two pivot seats;
at least one rail fixed to the base and located at one side of the screw;
a movable platform sleeved onto the screw and movable along the rail;
two support members sleeved onto the screw and movable along the rail, and located at two opposite ends of the movable platform;
a wheel rotatably disposed on the movable platform and including at least one first wheel portion, and a second wheel portion with a diameter smaller than a diameter of the first wheel portion;
a connecting member including two connecting ends fixed to the support members, and a connecting bottom surface which comes into contact with and is driven to move by the second wheel portion; and
a cover including two cover ends fixed to the two pivot seats, and a cover bottom surface which comes into contact with the first wheel portion.

2. The linear module with the support device as claimed in claim 1, wherein two said rails are fixed to the base in a parallel manner and located at two opposite sides of the screw, and each of the movable platform and the support members is provided with a slide block slidably disposed on the rail.

3. The linear module with the support device as claimed in claim 1, wherein the movable platform includes a top surface and a slot formed on the top surface, the wheel is rotatably disposed in the slot and partially protruded out of the top surface of the movable platform.

4. The linear module with the support device as claimed in claim 3, wherein a shoulder portion is formed on each of two opposite inner surfaces of the slot, the wheel further includes a shaft portion which is inserted through the first and second wheel portions and has two ends disposed on the shoulder portions.

5. The linear module with the support device as claimed in claim 1, wherein the wheel includes two said wheel portions, and each of the wheel portions is annularly provided with a plurality of first engaging teeth, and the cover bottom surface of the cover is provided with a rack for mating with the first engaging teeth.

6. The linear module with the support device as claimed in claim 5, wherein the cover bottom surface of the cover is provided with a groove for accommodation of the rack.

7. The linear module with the support device as claimed in claim 1, wherein the second wheel portion of the wheel is provided with second engaging teeth for mating with a rack portion which is formed at the connecting bottom surface of the connecting member.

8. The linear module with the support device as claimed in claim 1, wherein the wheel includes two said wheel portions, and the first wheel portion of the wheel is annularly provided with a plurality of first engaging teeth, the cover bottom surface of the cover is provided with a rack for mating with the first engaging teeth, and the second wheel portion of the wheel is provided with a plurality of second engaging teeth for mating with a rack portion which is formed at the connecting bottom surface of the connecting member.

9. The linear module with the support device as claimed in claim 1, wherein the diameter of the first wheel portion is two times the diameter of the second wheel portion.

10. The linear module with the support device as claimed in claim 1, wherein the cover bottom surface of the cover is provided with a groove for accommodation of an antiskid member which is kept into contact with the first wheel portion of the wheel.

* * * * *